Aug. 7, 1951  J. F. NAYLOR  2,563,184
CONVEYING MEANS FOR LAMINAR ARTICLES
Filed May 10, 1948

Joseph Francis Naylor
INVENTOR
BY
S. Victor Armstrong ATTORNEY.

Patented Aug. 7, 1951

2,563,184

UNITED STATES PATENT OFFICE 2,563,184

CONVEYING MEANS FOR LAMINAR ARTICLES

Joseph Francis Naylor, Newton-le-Willows, England, assignor to T. & T. Vicars Limited, Earlestown, Newton-le-Willows, England, a British company Application May 10, 1948, Serial No. 26,174
In Great Britain June 4, 1947

2 Claims. (Cl. 198—165)

This invention concerns the conveying of laminar articles, such as biscuits, from one level to another.

One object of the invention is an arrangement which is especially suitable for the conveying of biscuits or the like delicate articles, which may be damaged if undue stress is applied to them.

According to this invention the articles are engaged between two band conveyors, resilient means being provided for applying pressure to said articles by way of at least one of said conveyors. The resilient means aforesaid moving at the same speed as the conveyors.

The resilient means may be constituted by an endless band of material, such as canvas covered with a soft rubber material and supported on rollers, or may be in the form of a plurality of cross-members, such as slats each covered with soft rubber and carried on their ends by chains.

Alternatively, the resilient means may be constituted by a pneumatic flexible vessel such as a low pressure mattress supported on rods or by other rigid framework means and carried by chains or the like.

A further alternative is to provide a plurality of rotating members, such as rollers or wheels of resilient material adapted to bear against one of said conveyors.

The invention is further described with reference to the accompanying diagrammatic drawings, in which.

Figure 1:
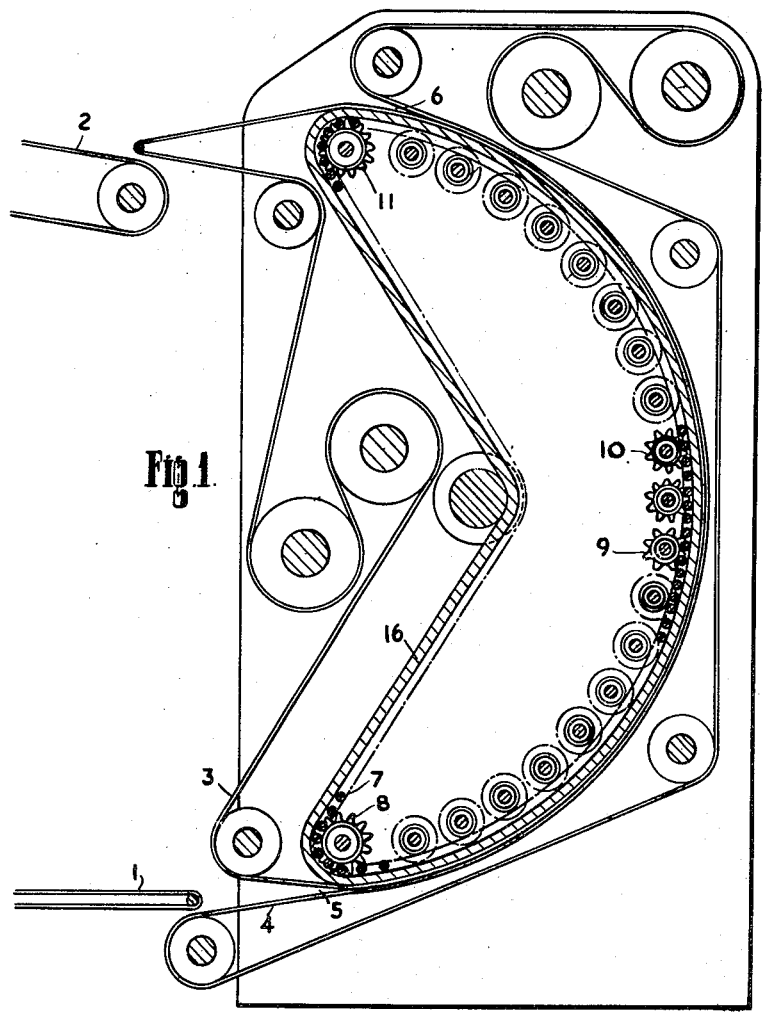
Fig. 1 is a sectional elevation of one form of construction.

Where flat laminar articles such as biscuits are conveyed from a lower level to a higher level, as from a continuously moving endless belt delivery conveyor 1 to a continuously moving endless belt receiver 2 at a higher level, this may be effected by feeding the articles tangentially into the bight between a pair of endless belt conveyors 3, 4, suitably guided by rollers as shown to lie in two curved paths of similar radius lying wholly within a circle circumscribed between the point 5 where the article is taken up between the belts 3, 4, and the point 6 where it is discharged therefrom. The belts 3, 4 are maintained at the desired tension in the curved path to frictionally grip an article tangentially therebetween by means of a thick rubber or the like resilient endless belt 16 supporting the opposite surface of one of the belts 3 to that which engages the laminar article frictionally between it and the belt 4. This belt 16 may be secured to a plurality of spaced lateral bars 7 engaged by the sprocket teeth on gear wheels 8, 9, 10, 11, the axes of which are grouped on a curved path conforming to the predetermined path of the belts 3, 4, between the points 5, 6.

Figure 2:
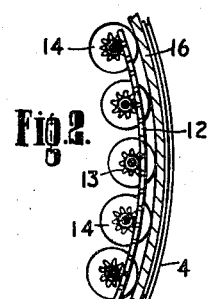
Fig. 2 is a partial view of an alternative form of construction of a resilient supporting element.

In the arrangement shown in Fig. 2, the resilient belt 16 is secured at its edges to chains 12 engaging with sprocket teeth 13 on rollers 14, the axes of which are disposed on a contour similar to the desired contour of the belts 3, 4, between the points 5, 6, the resilient belt 16 being held up in contact with the surface of the rollers 14.

I declare that what I claim is:

1. A machine for conveying laminar articles such as biscuits from a point at one level to a point at another level including in combination a pair of flexible conveyor webs, means to deflect said webs from their normal run in a curve which lies wholly within a circle circumscribed through the entry and exit points of the articles between the front surfaces of said conveyor webs and whose diameter extends between said points, a resilient endless moving support for one of said flexible conveyors contacting with it on its rear side opposite to that frictionally engaging the articles, and means to introduce the articles between the said webs.

2. A machine for conveying laminar articles such as biscuits from a point at one level to a point at another level including in combination a pair of flexible conveyor webs, means to deflect said webs from their normal run in a curve which lies wholly within a circle circumscribed through the entry and exit points of the articles between the front surfaces of said conveyor webs and whose diameter extends between said points, an endless thick belt of flexible resilient material in contact with the opposite side of one of said flexible conveyors to that side which contacts with the articles, means to hold up said endless thick belt at a plurality of points spaced along a curve similar to the contour of the curves of said flexible conveyor webs, positive means to drive said resilient belt, and means to introduce the articles between said webs.

JOSEPH FRANCIS NAYLOR.

REFERENCES CITED

The following references are of record in the file of this patent:

UNITED STATES PATENTS

| Number | Name | Date |
| --- | --- | --- |
| 142,234 | Howland et al. | Aug. 26, 1873 |
| 787,081 | Copland | Apr. 11, 1905 |
| 1,749,156 | Pflimlin | Mar. 4, 1930 |

FOREIGN PATENTS

| Number | Country | Date |
| --- | --- | --- |
| 9,211 of 1913 | Great Britain | Dec. 18, 1913 |
| 503,267 | Great Britain | Apr. 4, 1939 |
| 583,761 | France | Jan. 21, 1925 |